United States Patent [19]
Worden

[11] 3,714,886
[45] Feb. 6, 1973

[54] MEANS AND METHOD OF PRODUCING AN EXPANDED CEREAL PRODUCT

[76] Inventor: William W. Worden, P.O. Box 98, Thermal, Calif. 92274

[22] Filed: March 15, 1971

[21] Appl. No.: 123,999

[52] U.S. Cl. .................................99/467, 99/82
[51] Int. Cl. ..................................................A23l 1/18
[58] Field of Search....49/238, 235, 237, 82, 81, 234, 49/251

[56] References Cited

UNITED STATES PATENTS

| | | |
|---|---|---|
| 1,839,917 | 1/1932 | Ferguson...............................99/82 |
| 2,259,802 | 10/1941 | Crosby................................99/238 |
| 2,261,456 | 11/1941 | Warren..................................99/82 |
| 3,094,059 | 6/1963 | Graham...............................99/238 |
| 3,128,690 | 4/1964 | Maehl.................................99/238 |

Primary Examiner—Robert W. Jenkins
Attorney—Lyon & Lyon

[57] ABSTRACT

A means and method whereby bulk cereal is fed intermittently into an entrance chamber, steam pressurized and gravity fed into an elongated vertical superheated and pressurized steam chamber where the individual grains separate as they fall by gravity for intimate contact by super-heated steam to effect localized condensation of the steam and moisture impregnation. The grains being collected at the bottom of the steam chamber and subjected to continuous agitation and continuous extrusion to atmospheric pressure with attendant expansion in the course of discharge.

7 Claims, 4 Drawing Figures

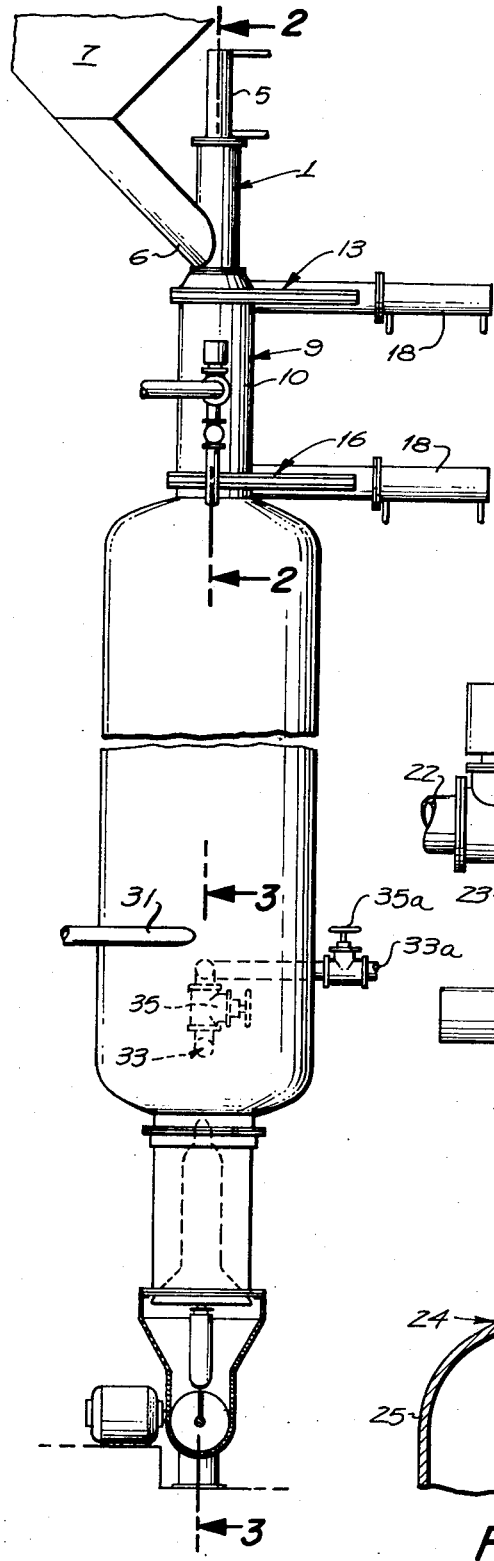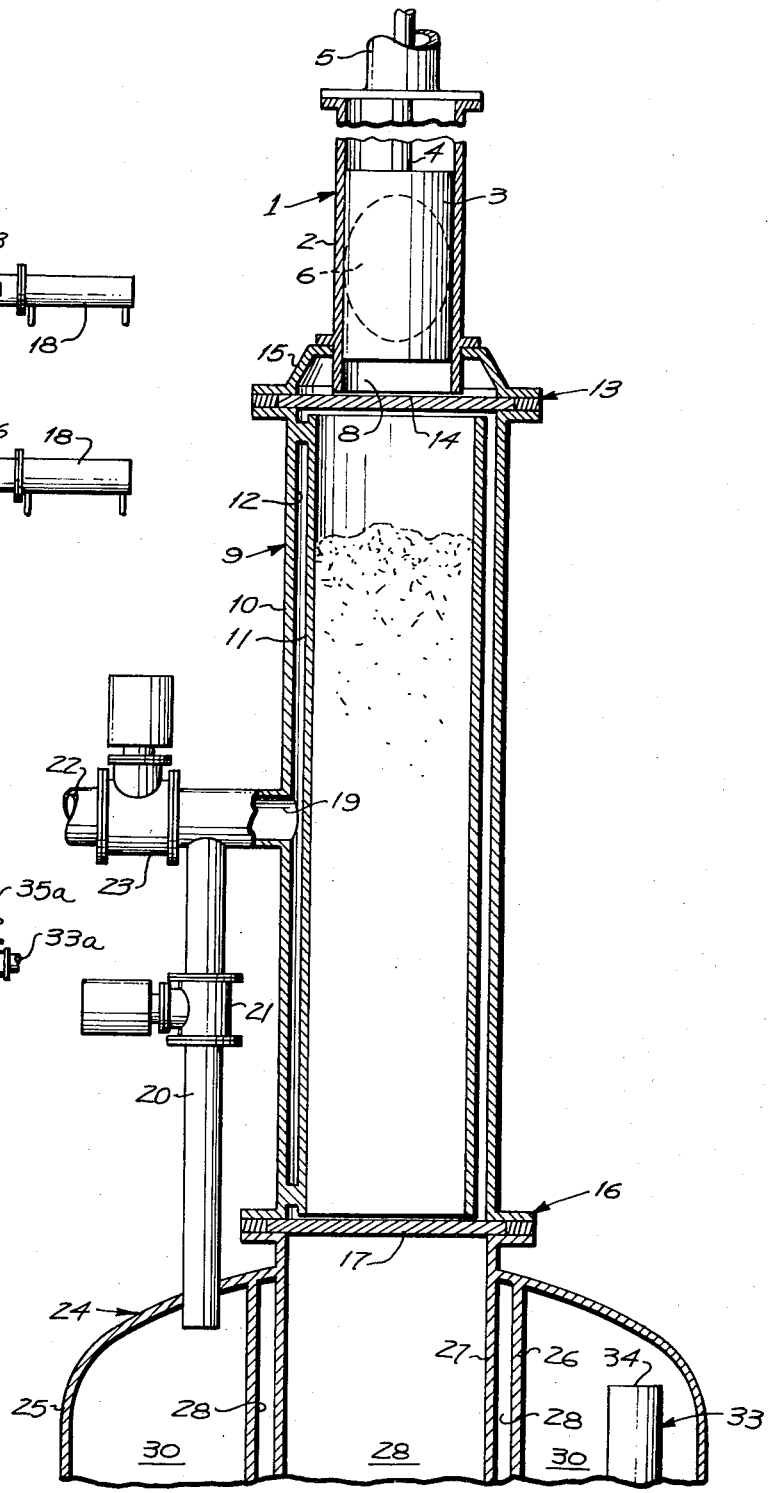

INVENTOR.
WILLIAM W. WORDEN
BY
Lyon & Lyon
ATTORNEYS

MEANS AND METHOD OF PRODUCING AN EXPANDED CEREAL PRODUCT

BACKGROUND OF THE INVENTION

Expanded or puffed food or cereal products have been manufactured for many years. Most of such products now produced are still produced essentially in the manner used to produce the puffed cereal first introduced to the public. More specifically, a relatively small batch of cereal grains is placed in a pressure vessel and cooked under pressure. The initial moisture in the grains and possible added moisture absorbed in the grains becomes heated until the moisture changes to steam. The pressure vessel is suddenly opened to atmospheric pressure, causing the grains to discharge violently and the contained steam to expand, enlarging or puffing the grains to several times their original size.

Representative intermittent operating puffing guns are found in U.S. Pat. Nos. 1,839,917; 2,261,456; 3,128,690 and 3,094,059. A representative continuous operating puffing gun is found in U.S. Pat. No. 2,622,985.

SUMMARY OF THE INVENTION

The present invention is directed to a means and method of producing an expanded cereal product which is summarized in the following objects:

First, to provide a means and method of expanding or puffing cereal grains, capable of extremely high volume production at such low cost that the resulting product may be priced low enough to permit its use as cattle feed; furthermore, the nutritional loss during processing may be maintained so low that the product has high nutritional value.

Second, to provide a means and method, as indicated in the preceding object, which while primarily directed to the production of cattle feed is not limited thereto; but, may be utilized to produce low cost, highly nutritional food for human consumption.

Third, to provide a means and method, as indicated, which is not only capable of preparing grains commonly used for human food, but is capable of preparing grains previously considered suitable only as cattle feed, in such a manner that the resulting product is both nutritional and palatable as a human food.

Fourth, to provide a means and method of producing an expanded grain food product, wherein steam supplied from the cooking vessel is utilized to pressurize batches of grain for introduction into the cooking vessel from which the cooked product is discharged continuously.

Fifth, to provide a means and method of producing an expanded grain food product, wherein each grain is steam pressurized while in a free falling state separated from the other grains to ensure adequate moisture penetration as well as rapid and uniform steam cooking of the grain for later expansion to a maximum extent.

Sixth, to provide a means and method of producing an expanded grain food product which incorporates a novelly arranged rotating wall extrusion orifice, permitting continuous discharge and simultaneous expansion of the product.

DESCRIPTION OF THE DRAWINGS

FIG. 1 is a side view of the means and method of producing an expanded cereal product, with a lower portion thereof in section.

FIG. 2 is an enlarged fragmentary sectional view, taken through 2—2 of FIG. 1, showing the upper portion of the apparatus.

Figures 3, 4:
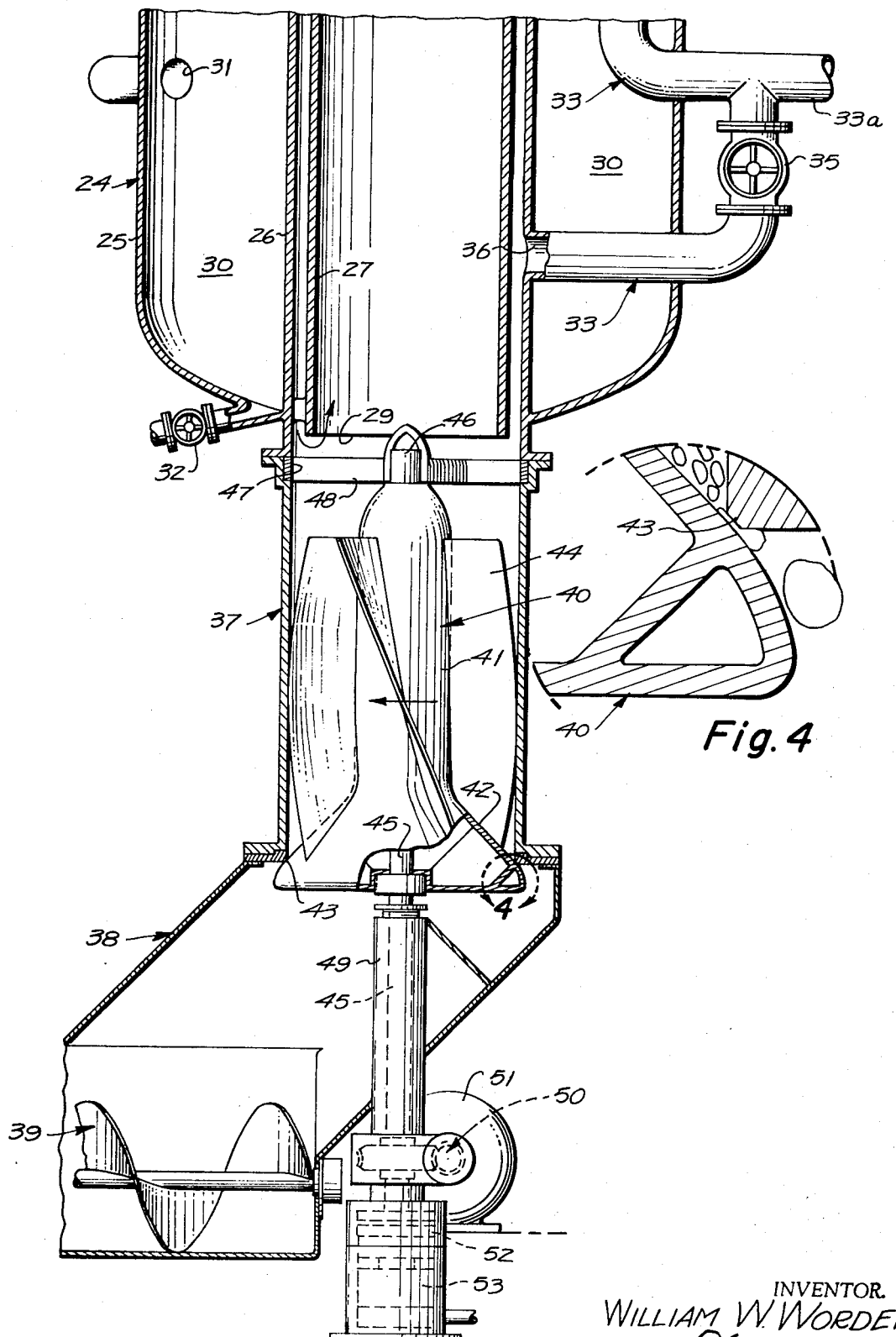
FIG. 3 is an enlarged fragmentary sectional view, taken through 3—3 of FIG. 1, showing the lower portion of the apparatus.
FIG. 4 is a further enlarged fragmentary sectional view, taken within Circle 4 of FIG. 3, showing particularly a portion of the discharge orifice.

The means or apparatus for producing an expanded cereal product includes a cereal or grain admission valve 1, having a cylindrical valve body 2 disposed in a vertical position and containing a plunger 3, having a stem 4 to which is connected a hydraulic operator 5.

The valve body 2 is provided with an upwardly directed side outlet 6, communicating with a hopper 7. The lower end of the valve body is provided with a downwardly directed axial outlet 8.

Mounted under the grain admission valve 1 is a cereal or grain pressurizing vessel 9, which includes a vertically disposed outer shell 10. Supported within the outer shell is a concentric collector tube 11, forming with the outer shell an annular steam chamber 12.

Connected with the outer shell 10 at its upper end is an inlet valve 13, preferably of the slide gate type, in which the slide gate 14 is disposed horizontally and moves laterally with respect to the grain pressurizing vessel 9. The inlet valve 13 includes a cover plate 15 which supports the valve body 2, so that the contents of the valve body may be discharged into the upper end of the collector tube 11.

The lower end of the grain pressurizing vessel 9 is provided with an outlet valve 16, which may be similar to the inlet valve 13, and provided with a gate 17. The inlet valve 13 and outlet valve 16 are operated by conventional hydraulic operators 18. The ends of the tube 11 clear the gates 14 and 17 to provide access for steam.

Extending laterally from the outer shell 10 and in communication with the steam chamber 12, is a steam inlet-outlet connection 19, which is joined to a steam inlet line 20 through an inlet valve 21, and to a steam exhaust line 22 through an exhaust valve 23.

Below the grain pressurizing vessel 9, in vertical alignment therewith, is a steam impregnating vessel 24, which includes an elongated outer shell 25 of sufficient strength to contain steam at a high pressure and temperature. The shell 25 is suitably encased in insulating material, not shown. Centered within the vessel 24, and welded at its ends thereto, is a jacket tube 26. Within the jacket tube 26 is a steam impregnating tube 27 which extends through the upper end of the vessel 24 and is joined to the outlet valve 16 in alignment with the collector tube 11 so that when the outlet valve 16 is open, material contained in the collector tube 11 may fall into the steam impregnating tube 27.

The jacket tube 26 forms with the steam impregnating tube 27 a steam jacket 28, closed at its upper end, but communicating with the open lower end of the tube 27, as indicated by 29 in FIG. 3. The substantial space formed between the jacket tube 26 and the shell 25 forms a steam reservoir 30.

A steam inlet line 31 communicates with the steam reservoir 30, intermediate its ends. The steam inlet line preferably intersects tangentially to give rotational movement to the steam contained in the reservoir 30, and thus tends to separate out water by centrifugal action. The lower end of the steam reservoir 30 is provided with a condensate bleed valve 32, or conventional automatic steam trap. A steam line 33 is provided, which has a receiving end 34 at the upper portion of the steam reservoir 30 to receive the driest steam. The steam line extends downwardly therefrom, preferably within the reservoir, except for an exposed portion provided with a valve 35. The lower end of the steam line communicates with the steam jacket 28, as indicated by 36. The exposed portion may be connected to a water inlet line 33a, controlled by a valve 35a. Introduction of water moisturizes the steam if too dry and also acts as a desuperheater.

Joined to the lower end of the jacket tube 26 which protrudes from the shell 25, is a cylindrical collector vessel 37, the lower end of which is joined to a receiver chute 38, which in turn, communicates with a conveyor 39, such as a screw conveyor. Mounted within the collector vessel 37 is a rotary discharge valve 40, having a hub 41 and a belled lower end 42. The lower end of the collector vessel is provided with a valve seat 43, which confronts the belled end 42 of the discharge valve. Radiating from the hub 41 and the belled end 42 are helically disposed radially extending stirring vanes 44.

The valve 40 is supported by a central shaft 45, having an upper bearing 46 disposed within a mounting ring 47, having radial spokes 48. The lower end of the central shaft extends downwardly through a sleeve bearing 49 mounted in the receiver chute 38 and protruding from the underside thereof. The lower end of the shaft 45 is connected by a gear drive 50 to a motor 51, so that the discharge valve 40 may be rotated continuously at a relatively low speed.

The shaft 45 extends through the gear drive and is supported by a thrust bearing 52, which in turn, is supported by a hydraulic operator 53 so that the mounting shaft and the discharge valve 40 may be raised and lowered.

The method of producing an expanded cereal product is as follows;

It should be understood that the term "grain" or "cereal" is used in its broad sense, and may be natural grains such as oats, barley, milo, wheat, corn, rice and the like. Also, the grains may be a composite starch material formed in part from natural grains and containing seasoning and other materials, prepared so as to be grainlike in appearance, including a containing shell, which is water permeable, and internal material which is water or steam impregnatable.

The grains or grainlike material is initially retained in the hopper 7 and is admitted periodically into the grain pressurizing vessel 9 through the valve 1. The inlet and outlet valves 13 and 16 are manipulated so that during entrance of the grains, the outlet valve is closed and the inlet valve is open. The admission valve 1 is opened long enough to permit the collector tube 11 to receive a charge of the grains, preferably filling the collector tube to a level near the inlet valve 13.

During the inlet cycle, the collector tube 11 is exposed to ambient pressure through the exhaust line 22 an exhaust valve 23. When a charge of grain has been received, and the admission valve 1 has been closed, the inlet valve 13 is closed and steam is admitted through he inlet line 20 and inlet valve 21. The inlet line may communicate with the steam reservoir 30. When the collector tube 11 and surrounding steam chamber have been pressurized, the outlet valve 16 is open so that the contents of the vessel 9 will discharge into the steam impregnating tube 27.

It is essential that the surface of the grains contained in the hopper be free of water coating or other coating which would cause the grains to adhere to each other. The dwell time in the collector tube 11 is held to a minimum and the driest available steam, such as from the top of the steam reservoir 30 is used. If desired, pressurized and heated dry air may be used. The reason for these precautions is to ensure that the charge of grain falls freely; that is, the grains do not stick to each other as they fall and no grains cling to the walls of the collector tube.

The steam impregnating vessel 24 and its steam reservoir 30 are maintained at a predetermined pressure and temperature or pressure-temperature range. The valve 35 is also maintained open or partially opened condition so that steam is maintained in the steam impregnating tube 27 at a predetermined pressure or pressure range, which may be equal to or slightly lower than the pressure in the steam reservoir 30. This condition is maintained during operation of he apparatus, even though there be a continuous flow of steam from the discharge valve 40.

It is intended that the pressure in the collector tube 11 be essentially at the pressure within the steam impregnating tube 27 so that the grains contained in the charge fall freely and become separated from each other, permitting each grain to be fully exposed to the surrounding steam. Some pressure differentials may be tolerated, which have the effect of accelerating downward movement of the grains, or retarding downward movement to increase or decrease the length of time required for the grains to fall freely to the bottom of the tube 27 and into the collector vessel 37.

The individual grains on falling to the bottom of the collector vessel 37 are subjected to a rapid downward flow of steam as the steam discharges between the belled end 42 and the valve seat 43. The vertical height of the steam impregnating tube, the temperature and moisture content of the steam are predetermined depending upon the nature of the grain so that the individual grains are completely cooked or nearly so by the time the grains begin the collect at the bottom of the vessel 37.

The grains in the course of emerging from the space between the belled end 42 and valve seat 43 expand or puff and in their puffed state, fall into the chute 38 for removal by the conveyor 39.

It is, of course, essential that the grains contain moisture. Part of the moisture is supplied with the grain when introduced into the apparatus. If needed, this is accomplished by presoaking or by exposure to an atmosphere of proper humidity, providing that the surface condition, when the grain is introduced in the collector tube 11, is sufficiently dry as to avoid sticking. While some further moisture may be introduced, due to condensation on the comparatively cool surface of the grain, the grain is initially exposed to the steam in the collector tube 11. The short dwell time and compact nature of the charge of grain minimizes this. Instead, tests indicate that most of the condensation and steam impregnation takes place when the grains separate and are falling by gravity in the impregnation column 28. Further moisture is introduced when the grains is initially exposed to the steam, due to the relatively cool surface of the grains, for the colder grain causes a limited localized condensation of the steam, this occurring in that portion of the steam which actually contacts the grain surface and penetrates into the grain.

As it is intended to utilize the apparatus and method for the cooking and puffing of a wide range of grains and grain-like materials, the steam pressure and temperature may vary substantially. Steam pressure may range from 150 to 450 pounds and temperature may range from 300° to 700° F. If the steam is superheated, its pressure with respect to the temperature may be reduced.

Increased pressure reducers the impregnation time; however, it increases the dwell time of the separated grains as they move by gravity down the impregnation tube. That is, the effective specific gravity of the steam increases with pressure. At the pressure noted, the specific gravity ranges from 15 to 45 times its density at atmospheric pressure. As the specific gravity of the steam increases with respect to the specific gravity of the grains (approximately one-half that of water), the effect of the gravitational force is reduced. Increased temperature, of course, also reduces the cooking time. By adjustment of temperature and pressure, the optimum conditions for each type of grain or grain-like material can be selected.

The total time required between entrance of the grain to its discharge is in the order of 20 to forth seconds. It is intended that most of the cooking take place while the grains are falling by gravity in the impregnation tube. It should be noted that the steam within the impregnation tube is essentially in a quiescent state; that is, little or no upward or downward flow need take place. It should also be noted that no significant cooking takes place in the collector tube 11, as the filling and emptying cycle is quite rapid, so that a sufficient quantity of grains may be maintained in the collector vessel to prevent free discharge of steam therefrom.

The proportion of the cooking cycle occuring in the impregnation tube 27 and in the collector vessel 37 may vary substantially. In any case, the dwell time in the impregnation tube 27 is sufficient to prepare the grains for contact with the walls of the collector vessel and the rotor or valve 40 so that further cooking can occur without grain damage. Thus, the amount of cooking occurring in the collector vessel may be varied depending upon the type of grain, and the desired physical condition of the discharged product. In contrast, to the essentially quiescent condition within the impregnation tube 11, the steam in the collector vessel 37 flows downwardly with substantial force depending upon its entrance pressure.

As indicated, in FIG. 4, the grains tend to pass individually through the extrusion opening formed between the valve and the valve seat. During the grain discharge through the extrusion opening, each grain is probably subjected to its maximum heat transfer rate, but the duration is only a small fraction of a second.

Test runs of a wide variety of grains have been made, including oats, barley, milo, wheat, core and rice. It has been found that by proper control of temperature and cooking time, grain integrity can be maintained; that is, although sufficient gelatinization occurs incidental to the cooking, the integrity of the grain coating may be maintained so that the grains are expelled as individual units and although squeezed as they are ejected, tend to puff into symmetrical shapes. The optimum conditions, of course, vary substantially. For example, milo requires much more vigorous treatment than rice. In fact, heretofore, milo has been considered so difficult as to be impractical for puffing treatment.

While grain integrity is a desirable factor in producing a puffed cereal for human use, this is of secondary importance if the puffed grain is intended for animal use. This permits increased volume where the product is intended for animal use.

Irrespective of the intended use, the tonnage output by the means and method herein described is extremely high. Tests have indicated that na output of four to five tons per hours is feasible, and much higher output could be obtained if desired, and an adequate source of steam is provided.

Because of the fact that each grain is fully exposed and that the exposure is uniform, processing efficiency is one hundred per cent; that is, waste is virtually eliminated. Still further maximum grain expansion is attained; that is, the grain expands 10 to 14 fold, depending upon the grain being processed.

By reason of the fact that the time interval between entrance of the grain at the top of the apparatus and its discharge from the nozzle is minimal, as indicated in the order of 20 to 40 seconds, the loss in nutritional value of the grain is minimal, so that the resulting product, whether it be any of the natural grains or grains prepared from blends of natural grains, the food value may be maintained at a maximum level.

With regard to improvement in starch availability, tests have indicated that for barley puffed by the apparatus and method herein described, increased by a factor of four.

A different test was applied to milo, as follows:

Intraruminal Cattle Feeding Test

Table of Digestability

|  | Average Digestability | % Difference From Untreated |
| --- | --- | --- |
| Whole Milo | 35.97 | 0.00 |
| Steam Rolled | 51.32 | +42.67 |
| Cooked Rolled | 65.94 | +83.32 |
| Puffed | 95.80 | +265.50. |

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. A means of producing a puffed grain product, comprising:
   a. a steam impregnating vessel having an elongated vertical steam impregnation tube, and a steam jacket surrounding the tube, spaced therefrom, and communicating with the interior thereof;
   b. means for continuously supplying steam under pressure to the jacket for entry into the tube to maintain steam under pressure in the tube;
   c. a grain pressurizing means for initially subjecting grain to pressure approximating the steam pressure in the tube and introducing the grain under pressure into the upper end of the tube for free falling movement down the tube, thereby to expose the grains individually for impregnation by the pressurized steam contained in the tube;
   d. and nozzle means in communication with the lower end of the tube, continuously subjected to the steam pressure in the tube for continuous discharge of the steam impregnated grains, whereby on discharge, the grains are puffed by the steam therein.

2. A grain puffing means, as defined in claim 1, wherein the grain pressurizing means comprises:
   a. a vertical collector tube communicating with the upper end of the steam impregnating tube;
   b. valve means at the upper and lower ends of the collector tube operable, respectively, to admit a load of grain to the collector tube and discharge the load of grain into he steam impregnating tube;
   c. means for supplying steam to the collector tube at a pressure corresponding to the pressure in the steam impregnating tube prior to opening the lower valve means for discharge;
   d. and means for venting the steam from the collector tube to permit introduction of a load of grain into the collector tube.

3. A grain puffing means, as defined in claim 1, wherein the nozzle means comprises:
   a. a grain collector vessel continuing downwardly from the steam impregnating tube and terminating in an annular valve seat;
   b. a circular valve head confronting the valve seat;
   c. means for supporting the valve in opposition to the steam pressure in the collector vessel;
   d. means for adjusting the position of the valve head with respect to the valve seat;
   e. and means for continuously rotating the valve head.

4. A grain puffing means, as defined in claim 3, wherein the nozzle means further comprises:
   a. a hub extending from the valve head;
   b. and a set of stirring vanes extending therefrom into proximity to the walls of the grain collecting vessel.

5. A grain puffing means, as defined in claim 1, wherein the steam impregnating vessel further comprises:
   a. an enlarged outer shell forming a steam reservoir;
   b. A valve controlled steam line communicating from the steam reservoir through the steam jacket to supply steam to the space between the steam jacket and the steam impregnating tube, the lower end of the tube being open and forming with the jacket an annular entrance opening for entrance of steam into the tube at its lower end.

6. A means of producing a puffed grain product, comprising:
   a. means for causing grain to fall by gravity to effect separation of the grains while in free falling condition;
   b. means for subjecting the separated grains to steam under pressure and temperature to impregnate the grains with high pressure steam and at least partially cook the grains;
   c. means for collecting the grains and complete the cooking thereof;
   d. and means for continuously subjecting the collected grains to a rapid drop in external pressure to effect a continuous puffing of the grains.

7. A means for producing a puffed grain product, as defined in claim 6, wherein:
   a. the collecting means is a vertical collecting vessel having an annular valve seat;
   b. and the means for effecting reduction in pressure includes the annular valve seat and a continuously rotating valve head confronting the valve seat for form therewith an extrusion aperture having an upper side exposed to the steam under pressure and temperature and a lower side subjected to at least a materially lower pressure.

* * * * *